United States Patent
Swart et al.

(10) Patent No.: US 11,326,493 B2
(45) Date of Patent: May 10, 2022

(54) AMMONIA STORAGE CAPACITY OF SCR CATALYST UNIT

(71) Applicant: PACCAR Inc, Bellevue, WA (US)

(72) Inventors: Charles Wayne Reinhardt Swart, Bellingham, WA (US); Cynthia Chaffin Webb, Sedro-Woolley, WA (US); Maarten Meijer, Anacortes, WA (US); Varun Ramesh, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 73 days.

(21) Appl. No.: 17/002,507

(22) Filed: Aug. 25, 2020

(65) Prior Publication Data
US 2022/0025799 A1    Jan. 27, 2022

Related U.S. Application Data

(60) Provisional application No. 63/054,468, filed on Jul. 21, 2020, provisional application No. 63/056,131,
(Continued)

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0842* (2013.01); *F02B 63/042* (2013.01); *F02D 17/02* (2013.01); *F02D 41/024* (2013.01); *F02D 41/08* (2013.01); *F01N 2610/02* (2013.01); *F01N 2610/1453* (2013.01); *F01N 2900/08* (2013.01); *F01N 2900/1404* (2013.01);
(Continued)

(58) Field of Classification Search
CPC ...... F01N 3/208; F01N 3/0842; F01N 3/2066; F01N 2610/02; F01N 2610/1453; F01N 2900/08; F01N 2900/1404; F01N 2900/1411; F01N 2900/1622; F02B 63/042; F02D 17/02; F02D 41/024; F02D 41/08; F02D 2200/0411; F02D 2200/0414; F02D 2200/08
See application file for complete search history.

(56) References Cited

U.S. PATENT DOCUMENTS 8,778,290 B1    7/2014   Ren et al.
10,690,033 B1   6/2020   Johnson et al.
(Continued)

FOREIGN PATENT DOCUMENTS

CN   106246301 B        7/2019
DE   10 2010 034707 A1  2/2012
(Continued)

*Primary Examiner* — Audrey B. Walter
*Assistant Examiner* — Dapinder Singh
(74) *Attorney, Agent, or Firm* — Seed IP Law Group LLP

(57) ABSTRACT

The present disclosure describes methods for evaluating ammonia storage capacity of a close-coupled SCR unit while remaining compliant with prescribed emissions limits, methods of controlling an emission aftertreatment system including multiple SCR units and emission management systems for a vehicle including an internal combustion engine and an emission aftertreatment system that includes two or more SCR units.

19 Claims, 7 Drawing Sheets

Related U.S. Application Data filed on Jul. 24, 2020, provisional application No. 63/057,041, filed on Jul. 27, 2020.

(51) Int. Cl.
*F02B 63/04* (2006.01)
*F02D 17/02* (2006.01)
*F02D 41/02* (2006.01)
*F02D 41/08* (2006.01)

(52) U.S. Cl.
CPC ............... *F01N 2900/1411* (2013.01); *F01N 2900/1622* (2013.01); *F02D 2200/0411* (2013.01); *F02D 2200/0414* (2013.01); *F02D 2200/08* (2013.01)

(56) References Cited

U.S. PATENT DOCUMENTS

| | | |
|---|---|---|
| 10,753,255 B2 | 8/2020 | Schweizer |
| 10,760,513 B1 | 9/2020 | Huhn et al. |
| 10,920,641 B2 | 2/2021 | Kinnaird et al. |
| 11,035,274 B2 * | 6/2021 | Johansson ............. F01N 3/2066 |
| 2006/0153761 A1 | 7/2006 | Bandl-Konrad et al. |
| 2007/0079605 A1 | 4/2007 | Hu et al. |
| 2007/0082783 A1 | 4/2007 | Hu et al. |
| 2007/0122317 A1 | 5/2007 | Driscoll et al. |
| 2007/0193253 A1 | 8/2007 | Tsumagari |
| 2008/0072575 A1 | 3/2008 | Yan |
| 2009/0035194 A1 | 2/2009 | Robel et al. |
| 2009/0183501 A1 | 7/2009 | Gonze et al. |
| 2011/0000194 A1 | 1/2011 | Gonze et al. |
| 2011/0047964 A1 | 3/2011 | Yezerets et al. |
| 2011/0061372 A1 | 3/2011 | Levijoki et al. |
| 2011/0265452 A1 | 11/2011 | Geveci et al. |
| 2011/0271660 A1 | 11/2011 | Gonze et al. |
| 2013/0232958 A1 | 9/2013 | Ancimer et al. |
| 2013/0311065 A1 | 11/2013 | Sun et al. |
| 2014/0363358 A1 | 12/2014 | Udd et al. |
| 2015/0040543 A1 | 2/2015 | Shetney et al. |
| 2015/0276694 A1 | 10/2015 | Lahr |
| 2015/0314239 A1 | 11/2015 | Kawaguchi et al. |
| 2015/0337702 A1 | 11/2015 | Ettireddy et al. |
| 2016/0032803 A1 | 2/2016 | Ettireddy et al. |
| 2016/0186629 A1 | 6/2016 | Osburn et al. |
| 2016/0186630 A1 | 6/2016 | Osburn et al. |
| 2017/0051654 A1 | 2/2017 | Gupta et al. |
| 2017/0122159 A1 | 5/2017 | Bahrami |
| 2017/0130629 A1 | 5/2017 | Nagel et al. |
| 2017/0175604 A1 | 6/2017 | Devarakonda et al. |
| 2017/0234199 A1 | 8/2017 | Sun et al. |
| 2018/0080359 A1 | 3/2018 | Price et al. |
| 2018/0087426 A1 | 3/2018 | Dou et al. |
| 2018/0163589 A1 | 6/2018 | David et al. |
| 2018/0252136 A1 | 9/2018 | Concetto Pesce et al. |
| 2018/0274420 A1 * | 9/2018 | Kleinknecht ...... B01D 53/9495 |
| 2018/0274421 A1 | 9/2018 | Smith et al. |
| 2018/0334939 A1 | 11/2018 | Mital et al. |
| 2018/0345217 A1 | 12/2018 | Goffe |
| 2018/0345218 A1 | 12/2018 | Goffe |
| 2019/0155230 A1 | 5/2019 | Culbertson et al. |
| 2019/0360415 A1 | 11/2019 | Romanato |
| 2019/0383189 A1 | 12/2019 | Dou et al. |
| 2020/0316571 A1 | 10/2020 | Goffe |
| 2020/0332691 A1 | 10/2020 | Soeger et al. |
| 2021/0079826 A1 | 3/2021 | Voss et al. |
| 2021/0095590 A1 * | 4/2021 | Bastoreala ............ F01N 11/005 |

FOREIGN PATENT DOCUMENTS

| | | |
|---|---|---|
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

\* cited by examiner

AMMONIA STORAGE CAPACITY OF SCR CATALYST UNIT

BACKGROUND

Technical Field

The present disclosure generally relates to engine emissions management, and more particularly, to engine NOx emissions management.

Description of the Related Art

Although diesel engines are known to be more economical to run than spark-ignited engines, diesel engines inherently face challenges in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Engine exhaust aftertreatment system can be utilized to reduce or eliminate emissions of these and other combustion products.

Conventionally, effective emissions control by an engine aftertreatment system (EAS) requires temperatures of at least about 200° C. to be attained before diesel exhaust fluid (DEF) dosing may commence. However, during the EAS heat-up period under cold-start conditions (i.e., at temperatures of less than about 200° C.), the EAS is not effective at controlling emissions of certain combustion products to within regulatory parameters. Increasing the availability of ammonia within an EAS, especially when engine exhaust temperatures are about 200° C. or less increases the ability of the EAS to control emissions to within increasingly stringent greenhouse gas and ultra-low $NO_x$ regulations.

In a diesel engine, cold start emissions from the engine appear within the first 60 seconds after key-on. The appearance of cold start emissions occurs several minutes before a selective catalytic reduction (SCR) catalyst within an SCR bed of an EAS attains optimal temperature for $NO_x$ reduction (e.g., at 250-450° C.). In some situations, the total duration of the cold start phase is about 600 seconds after key-on during which about 30 g of engine-out $NO_x$ can be generated.

Existing methods for improving emissions control during the cold start phase face challenges in meeting greenhouse gas and ultra-low $NO_x$ regulations. One approach for shortening the SCR catalyst heat-up time is to locate a combined SCR and diesel particular filter (DPF) in the form of a SCR On-Filter (SCRF) close to the engine. However, this approach may not be sufficient to address the challenges posed by ultra-low $NO_x$ emissions regulations.

Another approach is to include an additional close-coupled SCR and diesel exhaust fluid (DEF) dosing system as close to the engine as possible to take full advantage of the available thermal energy of the engine exhaust gas. The ability to achieve high levels of exhaust $NO_x$ emissions control during cold portions of the startup phase, typically require that high levels of ammonia be stored in the SCR unit. However, as the SCR catalyst ages, the storage capacity of the catalyst decreases. Understanding the ammonia storage capacity of the SCR catalyst is valuable for purposes of diagnosis of an EAS and for purposes of controlling the performance of an EAS, especially during the cold start phase of an operation cycle.

BRIEF SUMMARY

In some aspects, embodiments of the present disclosure relate to methods of evaluating ammonia storage capacity of a selective catalytic reduction (SCR) unit in an emissions aftertreatment system (EAS) of an internal combustion engine. The method includes operating the EAS at steady-state conditions. During the steady state operation, diesel exhaust fluid is dosed into exhaust gas from the internal combustion engine upstream of a close-coupled SCR unit. Exhaust gas, into which the diesel exhaust fluid has been dosed is flowed through the close-coupled SCR unit. According to the method, the exhaust gas from the close coupled SCR unit is flowed through a downstream SCR unit. NOx emissions from the EAS are controlled by the downstream SCR unit. Dosing of the diesel exhaust fluid into the flowing exhaust gas upstream of the close coupled SCR unit is terminated and ammonia stored in the close coupled SCR unit is depleted. Dosing of the diesel exhaust fluid into the flowing exhaust gas upstream of the close coupled SCR unit is restarted and the close coupled SCR unit is reloaded with ammonia until it is determined that the close coupled SCR unit has reached a maximum ammonia loading. Upon determining the close coupled SCR unit has reached the threshold ammonia loading, the method involves determining (1) an amount of ammonia loaded in the close-coupled SCR unit after restarting dosing of diesel exhaust fluid into the flowing exhaust gas upstream of the close-coupled SCR unit, (2) an amount of ammonia used for NOx conversion in the close-coupled SCR unit after restarting dosing of diesel exhaust fluid into the flowing exhaust gas close-coupled of the close-coupled SCR unit and (3) an amount of ammonia oxidized in the SCR unit after restarting dosing of diesel exhaust fluid into the flowing exhaust gas upstream of the close-coupled SCR unit. The amount of ammonia stored in the close coupled SCR unit is evaluated by subtracting (2) and (3) from (1).

In another aspect, embodiments in accordance with the present disclosure include a method of operating an EAS that includes two or more selective SCR units and is connected to an internal combustion engine. The method includes steps of evaluating ammonia storage capacity of a close coupled SCR unit while operating the EAS at steady-state conditions. During the evaluation of ammonia storage capacity of the close coupled SCR unit, NOx emissions from the EAS are controlled using a downstream SCR unit. In accordance with this method, one or more operation parameters of the EAS are adjusted based on the result of the evaluating ammonia storage capacity of the close coupled SCR unit.

In another aspect, embodiments in accordance with the present disclosure include an emission management system for a vehicle including an internal combustion engine and an EAS that includes the close coupled SCR unit and a downstream SCR unit. The emission management system includes at least one non-transitory processor readable storage medium that stores one of processor executable instructions or data and at least one processor communicatively coupled to the at least one non-transitory processor readable storage medium. In operation, the processor receives an indication of an ammonia storage capacity of the close coupled SCR unit determine while operating the EAS at steady-state condition. The processor's stores the received indication of an ammonia storage capacity of the close coupled SCR unit determine while the EAS operates at steady-state conditions in the non-transitory processor readable storage medium. The processor automatically controls the operation of the internal combustion engine and/or the EAS, using the received indication of ammonia storage capacity, to control emissions from the EAS to prescribed limits.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
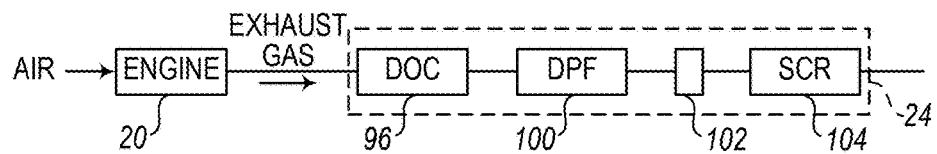
FIG. 1A is a schematic block diagram of an example of an emission aftertreatment system coupled to an internal combustion engine.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

FIG. 1A shows a block diagram providing a brief overview of a vehicle powertrain. The components include an internal combustion engine 20 in flow communication with one or more selected components of an emission aftertreatment system 24 (EAS). The illustrated emission aftertreatment system 24 includes an oxidation system 96 upstream of a particulate filter 100. In the embodiment shown, the oxidation system 96 is a diesel oxidation catalyst (DOC) 96 coupled in flow communication to receive and treat exhaust from the engine 20. The DOC 96 is preferably a flow-through device that includes either a honeycomb-like or plate-like substrate. The DOC substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust has flowed through DOC 96 it flows into the particulate filter 100, which in the illustrated embodiment is a diesel particulate filter (DPF) 100. The DPF 100 is utilized to capture unwanted diesel particulate matter from the flow of exhaust gas exiting engine 20, by flowing exhaust across the walls of channels within DFP 100. The diesel particulate matter includes sub-micron sized solid and liquid particles found in exhaust of a diesel fueled internal combustion engine. The DPF 100 can be manufactured from a variety of materials including but not limited to cordierite, silicon carbide, and/or other high temperature oxide ceramics.

From DPF 100, treated exhaust gases proceed through a compartment in fluid communication with a diesel exhaust fluid (DEF) doser 102 for the introduction of a reductant, such as ammonia or a urea solution into the exhaust gases. The exhaust gases and reductant then flow to a selective catalytic reduction (SCR) system or unit 104 which includes a catalytic core having a selective catalytic reduction catalyst (SCR catalyst) loaded thereon. System 24 can include one or more sensors (not illustrated) associated with components of the system 24, such as one or more temperature sensors, $NO_x$ sensors, $NH_3$ sensors, oxygen sensors, mass flow sensors, particulate sensors, and a pressure sensors.

As discussed above, the emission aftertreatment system 24 includes a Selective Catalytic Reduction (SCR) system 104. The SCR system 104 includes a selective catalytic reduction catalyst which interacts with $NO_x$ gases to convert the $NO_x$ gases into $N_2$ and water, in the presence of an ammonia reductant. The overall reactions of $NO_x$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

Figure 1B:
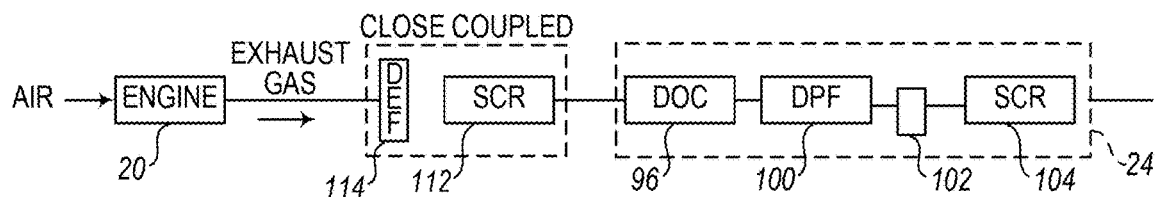
FIG. 1B is a schematic block diagram of an example of an emission aftertreatment system with a close coupled selective catalytic reduction unit coupled to an internal combustion engine.

Referring to FIG. 1B, some EAS include a "close-coupled SCR" or "upstream SCR" 112 associated with a DEF doser 114 located upstream of the close-coupled SCR 112. The close-coupled SCR 112 is located closer to the engine 20 than the downstream SCR 104 (sometimes referred to as an under-body SCR) and in some embodiments as close to the engine as possible. An example of a close-coupled SCR 104 configuration is illustrated in FIG. 1B. Such close-coupled SCR configuration employs dual DEF dosers 102 and 114 (one upstream of the close-coupled SCR 112 and one upstream of the downstream SCR 104 and below the close-coupled SCR 112.

Figure 1C:
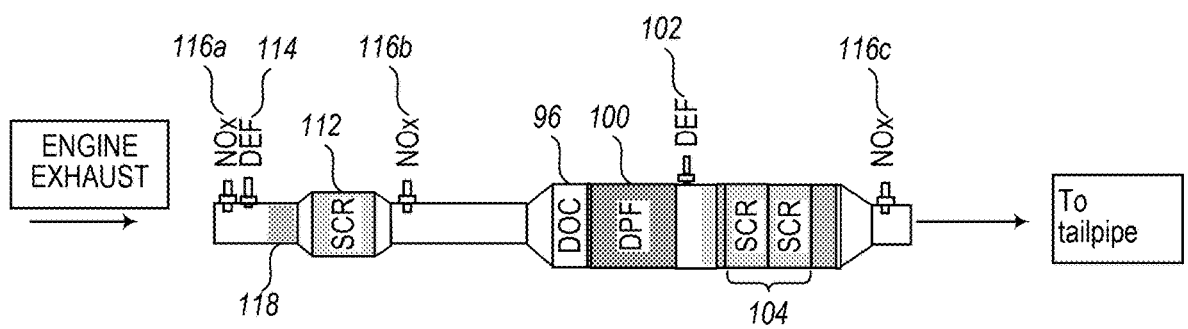
FIG. 1C is a schematic diagram of an example of an emission aftertreatment system with a close coupled selective catalytic reduction unit coupled to an internal combustion engine including a plurality of sensors, according to one non-limiting illustrated embodiment.

FIG. 1C illustrates an example of the EAS described above with reference to FIG. 1B. In FIG. 1C, the same reference numbers as used in FIG. 1B are used to identify identical features illustrated in FIG. 1C. For example, EAS illustrated in FIG. 1C includes first DEF doser 114, upstream SCR unit 112, diesel oxidation catalyst unit 96, diesel particulate filter 100, second DEF doser 102 and downstream SCR unit 104. In the embodiment illustrated in FIG. 1C, downstream SCR 104 is illustrated as included two bricks of substrates supporting SCR catalyst(s). EAS illustrated in FIG. 1C further includes a plurality of NOx sensors 116. A NOx sensor 116a is located upstream of DEF doser 114. NOx sensor 116b is located downstream of upstream SCR 112 which is upstream of downstream SCR 104. NOx sensor 116c is positioned downstream of downstream SCR 104. Such NOx sensors are designed to detect concentrations of NOx in the exhaust gas; however, such NOx sensors used in EAS are often unable to differentiate between NOx in the exhaust gas and ammonia in the exhaust gas. Accordingly, signals generated by the NOx sensors are an indication of the concentration or amount of NOx and ammonia in the exhaust gas the sensor is interrogating. In the embodiment illustrated in FIG. 1C, the EAS includes a thermal input device 118, e.g., an electric heater downstream of DEF doser 114 and upstream of SCR 112. This thermal input device is used, to introduce thermal energy into the exhaust gas, thereby increasing the temperature of the exhaust gas flowing into the close coupled SCR unit 112. The temperature of the exhaust gas flowing into the close coupled SCR unit 112 can also be adjusted through the implementation of an exhaust gas recirculation system which recirculates a portion of the exhaust gas to the internal combustion engine. Adjusting the temperature of the exhaust gas for into the close coupled SCR unit 112 is one way to adjust the temperature of the catalyst in the SCR unit 112. While the embodiment of an EAS illustrated in FIG. 1C includes two SCR units 112 and 104, embodiments of the present disclosure include an EAS that includes more than two SCR units and methods in accordance with embodiments of the present disclosure can be practiced in an EAS that includes two or more SCR units.

In accordance with an embodiment of the present disclosure, ammonia storage capacity of a close coupled SCR 112 is intrusively evaluated, i.e., during operation of an EAS including an upstream SCR 112 and while engine 20 is operating. In accordance with embodiments of the present disclosure, evaluation of ammonia storage capacity of a close-coupled SCR 112 includes varying the dosing of DEF during operation the EAS and engine, preferably at steady-state conditions as described below in more detail. Evaluating the ammonia storage capacity of an SCR 112 intrusively as described herein provides a more robust indication of the amount of ammonia stored in an SCR as compared to evaluating ammonia storage capacity based on ammonia storage capacity models. Understanding the ammonia storage capacity of an SCR is valuable for purposes of performing diagnostics on the performance of the EAS and/or components of the EAS, e.g., the close coupled SCR 112. In other embodiments, understanding the ammonia storage capacity of the close coupled SCR 112 is valuable for purposes of controlling the operation of the EAS, including components of the EAS, for example, the DEF doser 114 or the heater 118. In accordance with embodiments of the present disclosure, such intrusive evaluation of the ammonia storage capacity of the close coupled SCR unit 112 is carried out while the downstream SCR 104 maintains NOx emissions from the engine within prescribed limits.

Figure 2:
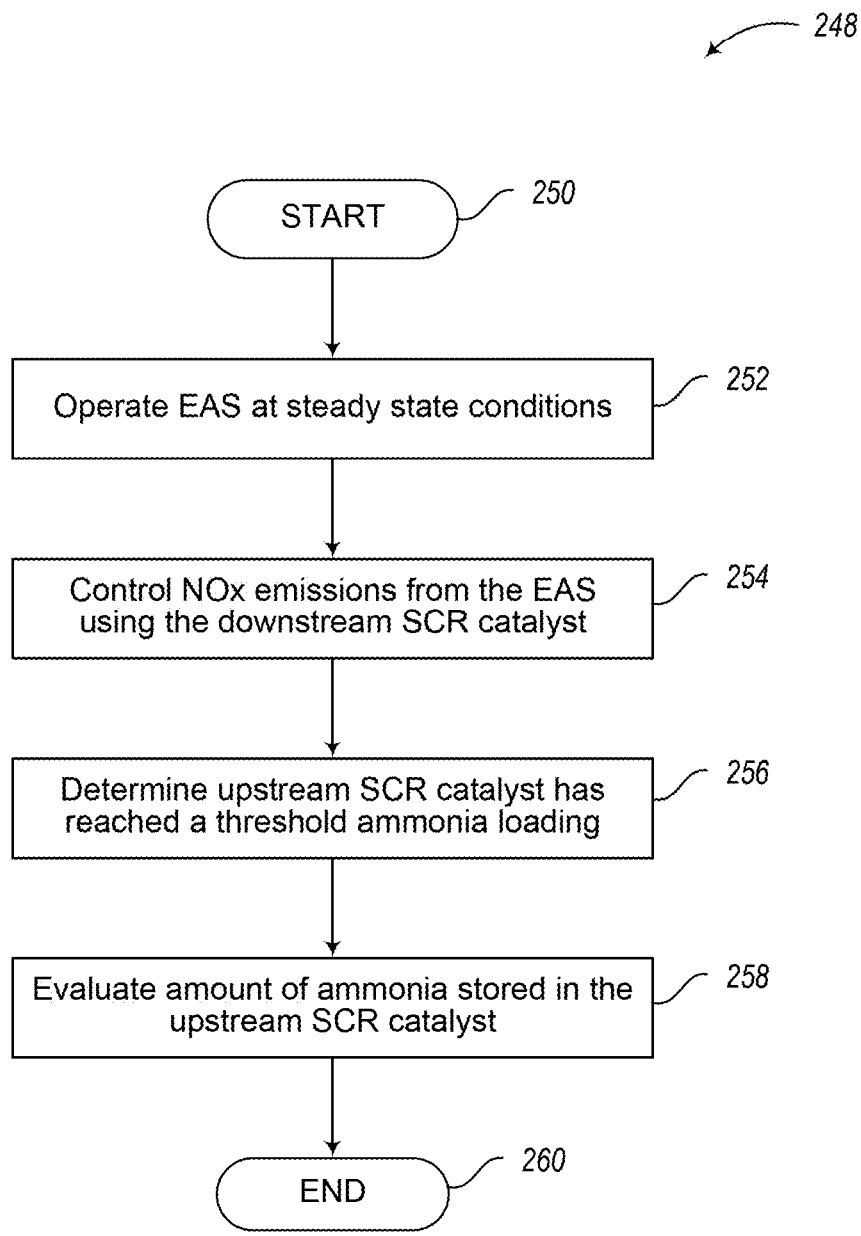
FIG. 2 is a flow diagram of a method of evaluating an amount of ammonia stored in a close-coupled SCR unit, according to one non-limiting illustrated embodiment.

Referring to FIG. 2, in accordance with an embodiment of the present disclosure, a method 248 of evaluating an ammonia storage capacity of an SCR starts at step 250. The method includes operating an internal combustion engine in fluid communication with an EAS, such as an EAS illustrated in FIG. 1C that includes a close-coupled or upstream SCR and a downstream or under-body SCR. In accordance with method 248, at step 252 the EAS is operated at steady state conditions. Steady-state conditions of the EAS include a substantially constant temperature of the close coupled SCR 112, a substantially constant volumetric flow of exhaust gas through the close coupled SCR 112 a substantially constant NOx content of the exhaust gas flowing to the close coupled SCR unit 112. As used herein with reference to the internal combustion engine, steady-state conditions, refers to: substantially constant RPM, substantially constant load, substantially constant exhaust gas temperature, substantially constant volumetric flow of exhaust gas and substantially constant NOx concentration. The steady-state conditions are not limited to those recited above and can include other operating conditions of the EAS and the internal combustion engine. The term "substantially constant" as used herein, refers a variance of less than 15% above or below the average value of the variable during the period in question. For example, an exhaust gas temperature would be "substantially constant" when the exhaust gas temperature is between 85% and 115% of the average temperature of the exhaust gas at the point of measurement (e.g., exiting the internal combustion engine or entering the close coupled SCR unit) during the period in question. The term "constant" as used herein, refers to the variable in question being within 5% of the average value of the variable during the period in question. For example, an exhaust gas temperature would be "constant" when the exhaust gas temperature is between 95% and 105% of the average temperature of the exhaust gas at the point of measurement (e.g., exiting the internal combustion engine or entering the close coupled SCR unit) during the period in question.

In accordance with method 248, during operation of the EAS at steady state conditions, at step 254, NOx emissions from the EAS are controlled to be within prescribed limits by the downstream SCR 104 in FIG. 1C.

At step 256, as described in more detail below with reference to FIG. 3, method 248 determines when upstream SCR has reached a threshold ammonia loading, e.g., a maximum ammonia loading. Upon determining that upstream SCR has reached a threshold ammonia loading, the ammonia storage capacity of the upstream SCR is evaluated as described below in more detail with reference to FIG. 3. The method illustrated in FIG. 2, ends at step 260.

Figure 3:
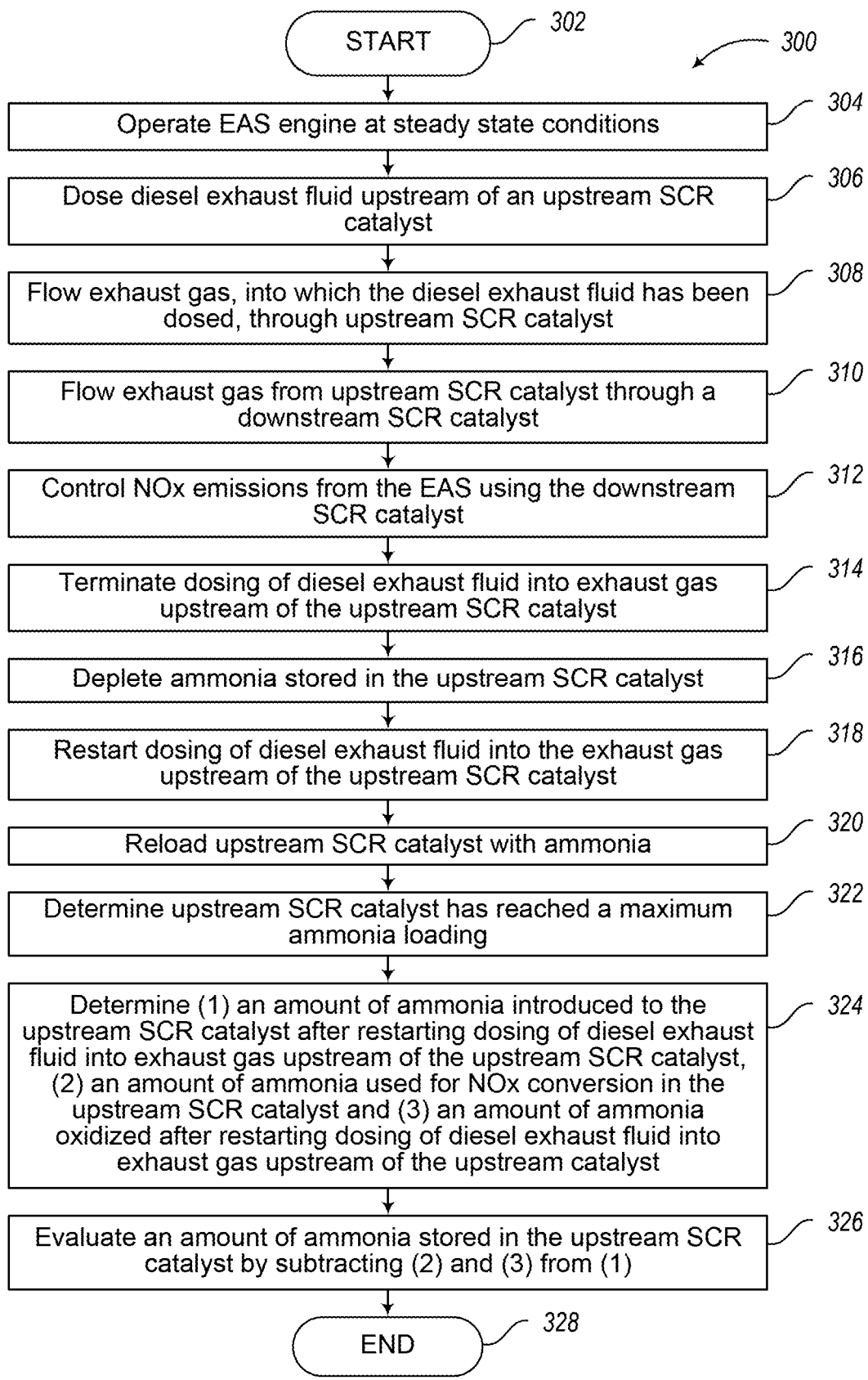
FIG. 3 is a flow diagram of a method of evaluating an amount of ammonia stored in a close-coupled SCR unit, according to one non-limiting illustrated embodiment.

Referring to FIG. 3, a method 300 of evaluating ammonia storage capacity of a close coupled SCR in accordance with a disclosed embodiment is illustrated. Method 300 starts at step 302. Step 304, is similar to step 252 described above with reference to FIG. 2. Step 304 includes operating an EAS connected to an internal combustion engine (including at least a close-coupled SCR 112 and a downstream SCR 104) at steady-state conditions. During operation of the EAS at steady-state conditions, step 306 includes dosing diesel exhaust fluid from DEF doser 114 into the exhaust gas from internal combustion engine that is flowing through the EAS. The diesel exhaust fluid is dosed into the exhaust gas upstream of the close coupled SCR 112. The exhaust gas, including the dosed DEF is received by the close coupled SCR 112 at step 308. At step 310 exhaust gas from the close coupled SCR 112 flows to the downstream SCR unit 104. In accordance with the disclosed embodiment of FIG. 3, at step 312, emission of NOx from EAS is controlled by the downstream SCR catalyst bed 104. Downstream SCR 104 controls NOx emissions to within prescribed regulatory limits. At step 314, dosing of DEF into the exhaust gas upstream of the close-coupled SCR 112 is terminated or deactivated. At step 316, EAS continues to operate after dosing of DEF has terminated. As a result, ammonia stored in SCR 112 is depleted (via NOx conversion). Depletion of the ammonia stored in close coupled SCR 112 continues until it is determined that ammonia stored in close coupled SCR 112 has been exhausted, for example, by determining close coupled SCR 112 is no longer reducing the concentration of NOx in the exhaust gas entering SCR 112. In one embodiment, determining SCR 112 is no longer reducing the concentration of NOx in the exhaust gas entering SCR 112 is detected by comparing the NOx concentration sensed by NOx sensor 116b downstream of close coupled SCR 112 to the NOx concentration sensed by NOx sensor 116a, upstream of close coupled SCR unit 112. For example, when NOx sensor 116b outputs a NOx concentration equal to the NOx concentration output by NOx sensor 116a, this indicates SCR 112 is no longer converting NOx to desired products, e.g., because ammonia within SCR 112 has been depleted.

Figure 7:
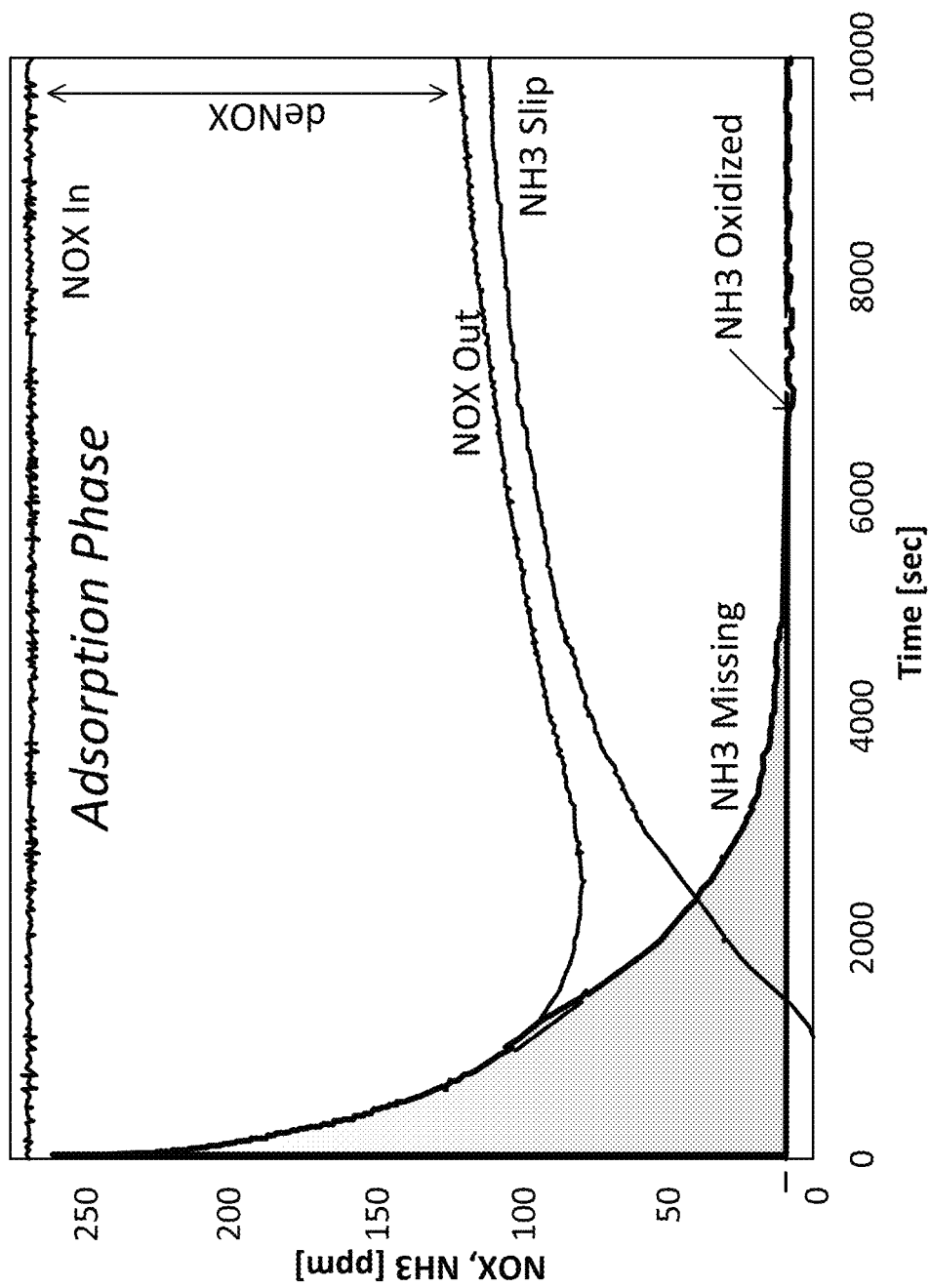
FIG. 7 is a plot of NOx and ammonia concentration vs time during an ammonia adsorption phase in accordance with embodiments of the present disclosure.

At step 318, upon determining that ammonia stored in the close coupled SCR 112 has been exhausted, while continuing to operate under EAS, steady-state conditions, dosing of DEF from DEF doser 114 upstream of close coupled SCR 112 restarts. Upon restarting DEF dosing from DEF doser 114, adsorption of ammonia within SCR 112 begins and NOx conversion within SCR 112 resumes. Referring to FIG. 7, the early stages of this "adsorption phase" for SCR 112 is characterized by a decrease in the signal generated by NOx sensor 116b (as reflected by plot 702). Although plot 702 is labeled as NOx out, as described above, NOx sensors 116 are unable to differentiate between NOx and ammonia; therefore, when ammonia is present in the exhaust gas that NOx sensors 116 are interrogating, the signal generated by the NOx sensors 116 is an indication of concentration of NOx and ammonia in the exhaust gas. When there is no ammonia present in the exhaust gas being interrogated by sensors 116, the signal generated by sensors 116 is an indication of the concentration of NOx in the exhaust gas. The decrease in the signal generated by NOx sensor 116b (referred to as NOx out of SCR 112 even though the signal may also represent ammonia out of SCR 112) in the early stages of the absorption phase is also reflected as an increase in deNOx (e.g., ppm of NOx into SCR 112 minus ppm of NOx out of SCR 112. deNOx is the difference between NOx In and NOx Out of SCR 112 and at the right hand side of FIG. 7 is indicated by difference 704. As the duration of the adsorption phase increases, the amount of ammonia loaded in SCR 112 increases, and therefore the ammonia "missing" from SCR 112 decreases as indicated by plot 706. The ability of a particular catalyst to convert NOx varies depending on the temperature of substrate in the close coupled SCR 112, the characteristics of the SCR catalyst itself and the amount of DEF dosed into the exhaust gas to be treated. The ability of a particular SCR catalyst to convert NOx is determined by testing the SCR catalyst under different conditions, e.g., catalyst temperature, NOx concentration, volumetric flow of exhaust gases and DEF dosing rates. From the results of this evaluation, a prediction can be made of level of NOx converted to nitrogen and water (e.g., level of deNOx) provided by a particular catalyst operating at a particular temperature. The deNOx achieved in close coupled SCR 112 can be predicted by multiplying the amount of NOx converted by the SCR catalyst as determined by the testing by the NOx concentration at the inlet of the close coupled SCR 112. From the values of NOx converted to nitrogen and water, whether based on actual measurements from NOx sensors upstream and downstream of the SCR 112 or from a prediction based on tests results performed on the catalyst, an amount of ammonia consumed for the amount of NOx converted (e.g., deNOx) can be calculated based on the stoichiometry of the NOx conversion.

FIG. 7 also reflects a plot of baseline level of ammonia that is oxidized in close coupled SCR 112. The amount of ammonia oxidized in close coupled SCR 112 is a function of substrate temperature within close coupled SCR 112 and the characteristics of the SCR catalyst within close coupled SCR 112. The amount of ammonia oxidized by the SCR catalyst is determined by testing the SCR catalyst under different conditions, e.g., catalyst temperature, NOx concentration, volumetric flow of exhaust gases and DEF dosing rates. The amount of ammonia oxidized within close coupled SCR 112 is determined by multiplying the ammonia concentration at the inlet to the close coupled SCR 112 by the amount of ammonia oxidized by the SCR catalyst as determined by the testing.

In accordance with the embodiment of FIG. 3, reloading of close coupled SCR 112 continues at step 320 until a threshold ammonia loading of close coupled SCR 112 is determined at step 322. In certain embodiments, a threshold ammonia loading is a maximum ammonia loading of close coupled SCR 112. A maximum ammonia loading of close coupled SCR 112 occurs when ammonia slip through close coupled SCR 112 begins. In the EAS embodiment of FIG. 2, such ammonia slip is indicated as an increase in the signal output by NOx sensor 116b (reflecting an increase in NOx and ammonia concentration in the exhaust gas interrogated by sensor 116b, which is unable to differentiate between NOx and ammonia). In FIG. 7, such ammonia slip is indicated by a change in the slope of the NOx out plot 702. Embodiments in accordance with the present disclosure are not limited to equating or determining the maximum ammonia loading of close coupled SCR 112 as the point in time when a change in the slope of the NOx plot is determined. In accordance with other embodiments of the present disclosure, the maximum ammonia loading of close coupled SCR 112 can be determined to occur when the other performance parameters of the close coupled SCR 112 indicate that ammonia slip has started to occur. Examples of such other parameters include a reduction in deNOx % of close coupled SCR 112.

In accordance with the embodiment of FIG. 3, upon determining that the close coupled SCR 112 has reached a maximum ammonia loading at step 322, method 300 includes step 324 which determines (1) the amount of ammonia loaded in the close coupled SCR 112 after restarting dosing of DEF into the exhaust gas upstream of the close coupled SCR 112. Step 324 also determines (2) an amount of ammonia used for NOx conversion in the closed-coupled SCR 112 after restarting DEF dosing and (3) an amount of ammonia oxidized within close coupled SCR 112 after dosing of DEF fluid restarted at step 318. At step 326, method 300 subtracts the amount of ammonia used for NOx conversion in the close coupled SCR 112 (2) and the amount of ammonia oxidized within close coupled SCR 112 after dosing of DEF was restarted (3) from the amount of ammonia introduced to the close coupled SCR 112 after restarting dosing of DEF into the exhaust gas upstream of the close coupled SCR 112 (1). The result of step 326 is evaluation of an amount of ammonia stored (e.g., the ammonia storage capacity of the close coupled SCR 112) in the close coupled SCR 112. Method 300 ends at step 328.

The amount of ammonia introduced to the close coupled SCR 112 after restarting dosing of DEF into the exhaust gas upstream of the close coupled SCR 112 (3) is determined based on the amount of DEF dosed into the exhaust stream upstream of the close coupled SCR 112. The amount of ammonia oxidized within close coupled SCR 112 after dosing of DEF restarted (3) is determined as described above. The amount of ammonia used for NOx conversion in the close coupled SCR 112 after dosing of the DEF restarts (2) is determined as described above.

Figure 4:
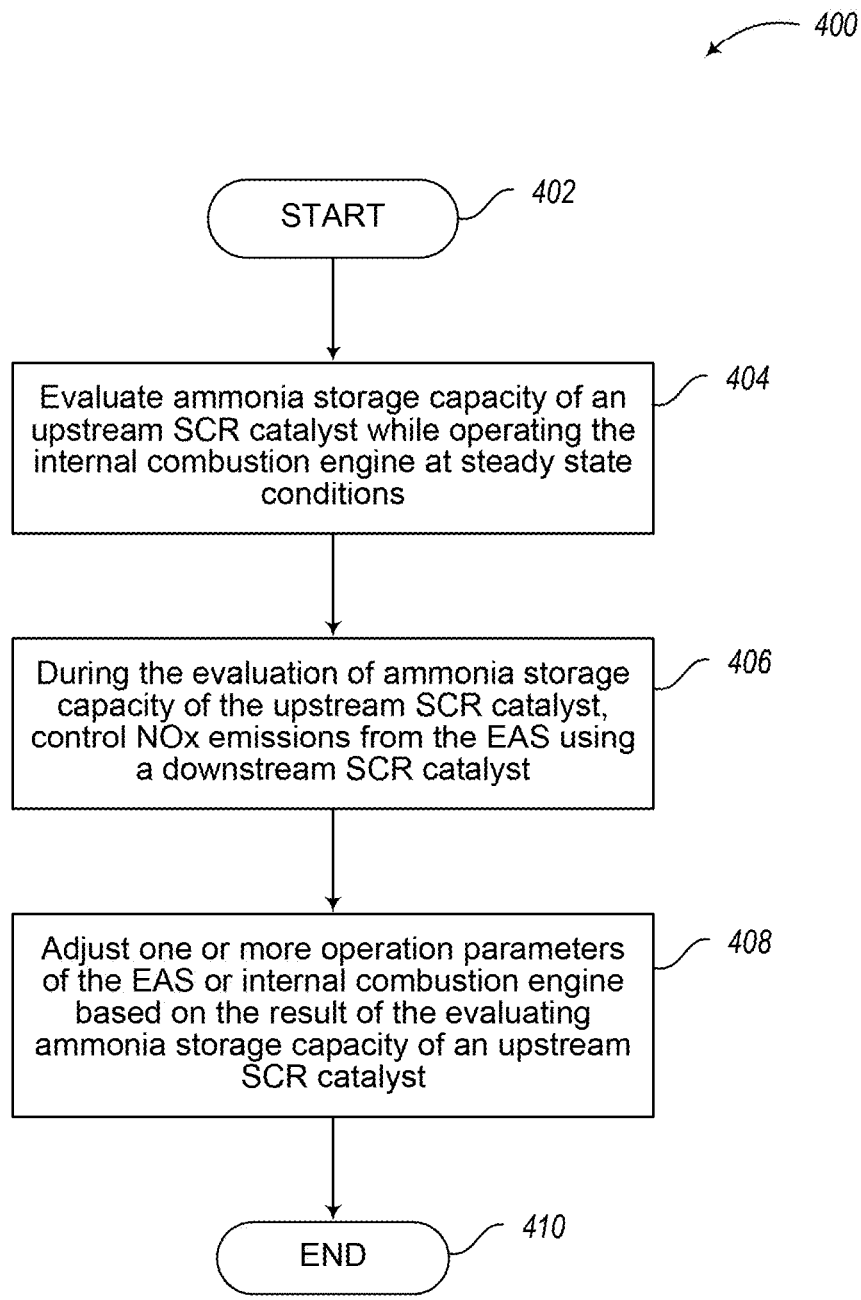
FIG. 4 is a flow diagram of a method of controlling an emission aftertreatment system that includes two or more SCR units, according to one non-limiting illustrated embodiment.

Referring to FIG. 4, a method 400 of controlling an emission aftertreatment system (EAS) that includes two or more selective catalytic reduction units in accordance with embodiments of the present disclosure is illustrated. Method 400 starts at step 402 and includes step 404 of evaluating ammonia storage capacity of a close coupled SCR while operating an EAS that includes the close coupled at steady state conditions. EAS steady-state conditions have been described above, and will not be repeated here in the interest of brevity. Evaluating ammonia storage capacity of a close coupled SCR has been described above with reference to FIG. 3 and will not be described in more detail here in the interest of brevity. In accordance with the embodiment of FIG. 4, at step 406, during evaluation of ammonia storage capacity of the close coupled SCR, NOx emissions from the internal combustion engine are controlled by the downstream SCR similar to the control of emissions from the internal combustion engine described above with reference to FIGS. 2 and 3. At step 408, one or more operation parameters of the EAS or internal combustion engine are adjusted based on the results of the evaluation of the ammonia storage capacity of the close coupled SCR. Examples of such one or more operation parameters of the EAS or internal combustion engine include dosing rate of diesel exhaust fluid to an upstream SCR unit, dosing rate of diesel exhaust fluid to a downstream SCR unit, temperature of the upstream SCR unit and temperature of the downstream SCR unit, load on the internal combustion engine, temperature of exhaust gas from the internal combustion engine and volumetric flow of air through the internal combustion engine, volumetric flow rate of exhaust gases, volumetric flow of air to the engine, fuel/air ratio to engine, temperature of air flow to engine, NOx content of the exhaust gas from engine, NOx content of exhaust gas exiting an SCR unit, temperature of the engine, an operating speed of the internal combustion engine 102 (e.g., in RPM) and level of exhaust gas recirculation (EGR). Embodiments in accordance with the present disclosure are not limited to the foregoing operational parameters. Operational parameters of the internal combustion engine or the EAS in addition to those expressly listed above can be adjusted in accordance with the present disclosure.

Figure 5:
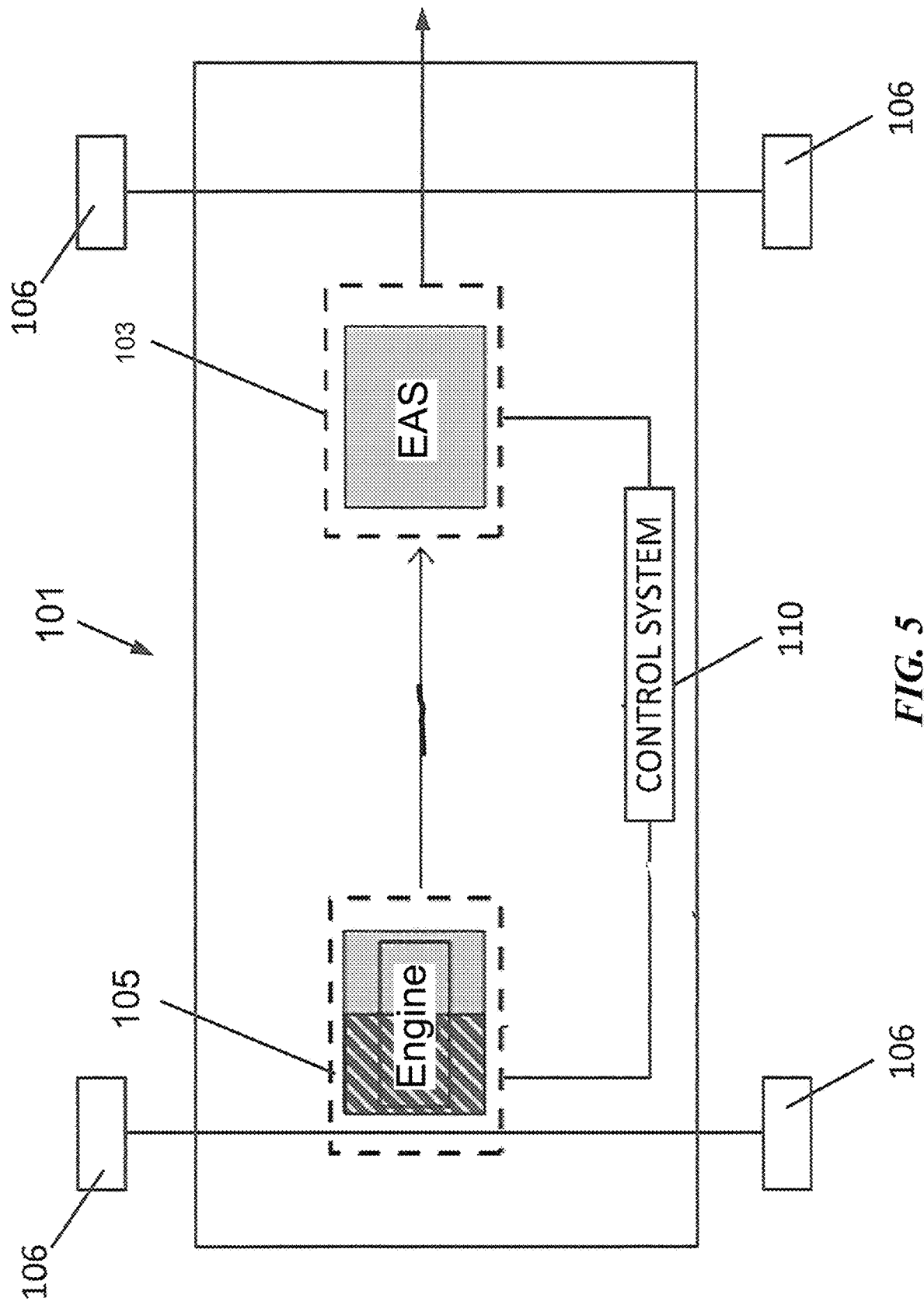
FIG. 5 illustrates a vehicle including an internal combustion engine, an emission aftertreatment system and a control system configured to control components of the engine and emission aftertreament system according to certain methods in accordance with embodiments described herein.

FIG. 5 illustrates a schematic diagram of a vehicle 101, which may be a heavy-duty vehicle, with an internal combustion engine 102, which may be a diesel engine, an exhaust after-treatment system 103, a set of at least four wheels 106 configured to be powered and driven by the engine 102, and a control system 110, which can perform the methods described herein. When the vehicle 101 is in operation, the control system 110 can be used to control operation of portions of the vehicle 101, including its internal combustion engine 102 and its emission aftertreatment system 103. For example, the control system 110 may be configured to control the engine 102 to idle with any number of its cylinders firing and any number of its cylinders deactivated, to control the engine 102 to increase the load on the engine 102, for example by driving an electric generator (not shown), to direct electrical energy generated by the electrical generator into an exhaust gas stream at a location between the engine 102 and the emission aftertreatment system 103, to increase or decrease the temperature of the gases exhausted from the engine and/or to increase or decrease the volumetric flow of air through the engine. These examples of functions the control system 110 is able to control or initiate are not exhaustive. The control system 110 in accordance with embodiments of the present disclosure may be able to control or initiate other functions of the engine or vehicle. As another example, the control system 110 may be configured to control the exhaust aftertreatment system 103 and components thereof, including a diesel oxidation catalyst (DOC) to oxidize unburned fuel and carbon monoxide, a diesel particulate filter (DPF) to control particulate matter (PM), a selective catalytic reduction (SCR) system to reduce oxides of nitrogen (NOX), and an ammonia oxidation catalyst (AMOX) system. For example, in some embodiments, the control system 110 is configured to control an amount of thermal energy introduced into the gas exhausted by the engine, to control the dosing rate of diesel exhaust fluid to the EAS and/or to control temperature of an upstream or downstream SCR units.

In some embodiments, the vehicle 101 includes a plurality of sensors that collect and transmit data regarding operating parameters of the vehicle 101 and/or operating parameters of the EAS to the control system 110, such as continuously. For example, such sensors may collect and transmit data regarding an exhaust gas temperature, volumetric flow rate of exhaust gases, volumetric air flow rate to engine, fuel/air ratio to engine, temperature of air flow to engine, NOx content of the exhaust gas, NOx content of exhaust gas exiting the SCR units, volumetric flow of DEF dosing, temperature of the engine, an operating speed of the internal combustion engine 102 (e.g., in RPM) to the control system 110, load on the engine, temperature of SCR unit and level of exhaust gas recirculation (EGR). In some embodiments, the control system 110 may control operation of the vehicle 101, such as in accordance with any of the techniques described herein, based on such measurements and data, such as when such measurements fall below certain specified thresholds, e.g., when the exhaust gas temperature falls below any of the exhaust gas temperatures mentioned herein, such as 190° C., or when the internal combustion engine 102 is idling, as identified, for example, when the operating speed of the internal combustion engine 102 falls below 550 RPM, or 600 RPM, or 650 RPM, or 700 RPM, or 750 RPM, or 800 RPM. Other sensors may collect and transmit data regarding the EAS. For example, such sensors can collect and transmit data regarding NOx into an upstream SCR or into a downstream SCR, NOx out of an upstream SCR or out of a downstream SCR, quantity of DEF dosing and temperature of upstream and/or downstream SCR.

Figure 6:
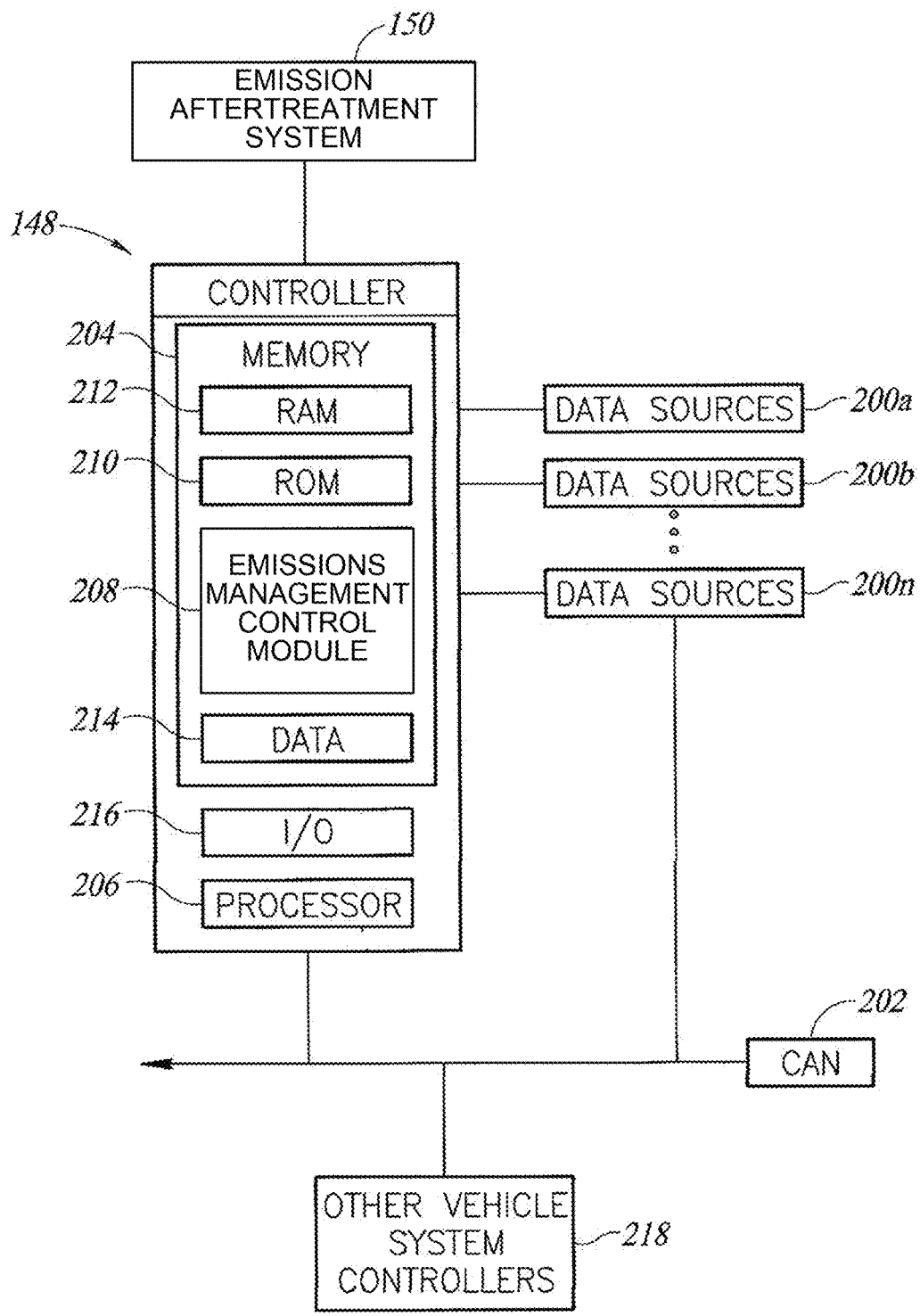
FIG. 6 is a schematic block diagram of an emission management system in accordance with some embodiments disclosed herein.

FIG. 6 shows one non-limiting example of an emissions aftertreatment system controller 148 formed in accordance with aspects of the present disclosure and can be part of the control system 110. The control system may be an emissions management system associated with an EAS system of a vehicle powered by an internal combustion engine or an EAS of an internal combustion engine implemented in a stationary application. The controller 148 is connected in electrical communication with a plurality of data sources 200*a*-200*n* (generally, data sources 200). As will be described in more detail below, the data sources 200 may include but are not limited to on-board sensors, e.g., engine sensors and EAS sensors, on-board state estimators, etc. It will be appreciated that the controller 148 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 101 via the CAN 202 for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, etc. In operation, as will be described in more detail below, the controller 148 receives signals from the data sources 200, processes such signals and others, and depending on the processed signals, transmits suitable control signals for operating the EAS 150, the engine 103 or other systems or components of the vehicle 101. The controller 148 initiates operation by means of a hard wired input (e.g. ignition key 154) or by receiving a signal from a communication network (e.g. wake-up on CAN). This wake-up message allows to bring the controller 148 in operation, whereas the operator does not need to use the ignition keys or be physically in or near the vehicle 101. The controller 148 may be a standalone controller or may be part of one or more other controllers (e.g., vehicle electronic control unit (VECU)) of the vehicle 101. Generally, the emission aftertreatment system may be implemented in any local or remote controller(s) operative to provide the functionality described herein.

In at least some embodiments, the controller 148 may contain logic rules implemented in a variety of combinations of hardware circuitry components and programmed processors to effect control of the EAS 150 and other systems of the vehicle 101. To that end, as further illustrated in FIG. 6, one suitable embodiment of the controller 148 includes a nontransitory memory 204, a processor 206, and emissions management control module 208 for providing functionality of the controller 148. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as engine restart control module 208, to implement the functionality described in the present disclosure.

The emissions management control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 101. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements the EAS management functionality described herein. However, it should be appreciated that the controller 148 may be a controller module, which could be software embedded within an existing on-board controller, such as the engine controller, a general purpose controller, other vehicle system controllers, etc.

As briefly described above, the data sources 200 can include but are not limited to on-board sensors for detecting operation parameters of an EAS, navigation/GPS devices, communications devices, data stores, remote servers, etc. These data sources and others in at least some embodiments may be part of the electrical systems 138, control console 132, etc., described above. The data supplied from these data sources 200 and others may generally or specifically relate to vehicle operating parameters, e.g., engine or EAS operating parameters, operator driving trends and accessories (e.g., loads 220) usage patterns and characteristics, and external parameters, including present vehicle navigation, traffic patterns, weather data, sunrise and sunset data, temperature data, among others.

One or more implementations of the present disclosure are directed to systems and methods for evaluating ammonia storage capacity of a selective catalytic reduction catalyst unit in an emission aftertreatment system of an internal combustion engine, for example, a diesel engine of a light-duty or heavy-duty vehicle. In at least some implementations, the systems and methods are operative to evaluate ammonia storage capacity of a SCR unit intrusively during operation of the EAS and internal combustion engine while remaining in compliance with existing emissions limits. The evaluation of ammonia storage capacity of an SCR unit in accordance with disclosed embodiments are used, to control operation of the internal combustion engine, and/or the EAS so as to optimize the fuel efficiency of the intern engine and the efficiency NOx conversion by the EAS.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, generator sets, etc. In addition, embodiments of the present disclosure have application with internal combustion engines which are not associated with vehicles. For example, embodiments of the present disclosure have application with internal combustion engines that are utilized in stationary applications, for example, power generation. Accordingly, the foregoing descriptions and illustrations herein should be considered illustrative in nature, and thus, not limiting the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of evaluating ammonia storage capacity of a selective catalytic reduction (SCR) unit in an emission aftertreatment system (EAS), the method comprising:
   operating the EAS at steady state conditions;
   dosing diesel exhaust fluid, into exhaust gas from an internal combustion engine, upstream of a close-coupled SCR unit;
   flowing the exhaust gas, into which the diesel exhaust fluid has been dosed, through the close-coupled SCR unit;
   flowing the exhaust gas from the close-coupled SCR unit through a downstream SCR unit;
   controlling NOx emissions from the EAS using the downstream SCR unit;
   terminating the dosing of diesel exhaust fluid into the flowing exhaust gas upstream of the close-coupled SCR unit;
   depleting ammonia stored in the close-coupled SCR unit;
   restarting the dosing of diesel exhaust fluid into the flowing exhaust gas upstream of the close-coupled SCR unit;
   reloading the close-coupled SCR unit with ammonia;
   determining the close-coupled SCR unit has reached a maximum ammonia loading; and
   upon determining the close-coupled SCR unit has reached the maximum ammonia loading, determine (1) an amount of ammonia loaded in the close-coupled SCR unit after restarting dosing of diesel exhaust fluid into the flowing exhaust gas upstream of the close-coupled SCR unit, (2) an amount of ammonia used for NOx conversion in the close-coupled SCR unit after restarting dosing of diesel exhaust fluid into the flowing exhaust gas upstream of the close-coupled SCR unit and (3) an amount of ammonia oxidized in the SCR unit after restarting dosing of diesel exhaust fluid into the flowing exhaust gas upstream of the close-coupled SCR unit; and evaluating an amount of ammonia stored in the close-coupled SCR unit by subtracting (2) and (3) from (1).

2. The method of claim 1, wherein the steady-state conditions include temperature of the close-coupled SCR unit being substantially constant.

3. The method of claim 2, wherein the steady-state conditions further includes volumetric flow of exhaust gas being substantially constant.

4. The method of claim 3, wherein the steady-state conditions further include, NOx content of the exhaust gas upstream of the close-coupled SCR unit being substantially constant.

5. The method of claim 1, wherein the downstream SCR unit controls NOx emissions from the EAS during the depleting ammonia stored in the close-coupled SCR unit.

6. The method of claim 1, wherein the determining the close-coupled SCR unit has reached a maximum ammonia loading further comprises:

evaluating an output of the close-coupled SCR unit using a NOx sensor downstream of the close-coupled SCR unit;

determining that a signal output by the NOx sensor representing a level of NOx in the output of the close-coupled SCR unit has increased.

7. The method of claim 6, wherein the determining that a signal output by the NOx sensor representing a level of NOx in the output of the close-coupled SCR unit has increased further comprises, for the close-coupled SCR unit, determining a % reduction in NOx content of the exhaust gas into the close-coupled SCR unit has decreased.

8. The method of claim 1, further comprising increasing an amount of diesel exhaust fluid dosed to the downstream SCR unit.

9. The method of claim 1, wherein the determining the close-coupled SCR unit has reached a maximum ammonia loading further comprises determining ammonia slip from the close-coupled SCR unit has begun.

10. A method of operating an emission aftertreatment system (EAS) that includes two or more selective catalytic reduction (SCR) catalyst units and is connected to an internal combustion engine, the method comprising:

evaluating ammonia storage capacity of a close-coupled SCR unit while operating the EAS at steady state conditions, the evaluating ammonia storage capacity of the close-coupled SCR unit including:

dosing diesel exhaust fluid, into exhaust gas from the internal combustion engine, upstream of the close-coupled SCR unit;

flowing the exhaust gas, into which the diesel exhaust fluid has been dosed, through the close-coupled SCR unit;

flowing the exhaust gas from the close-coupled SCR unit through a downstream SCR unit;

terminating the dosing of diesel exhaust fluid into the flowing exhaust gas upstream of the close-coupled SCR unit;

depleting ammonia stored in the close-coupled SCR unit;

restarting the dosing of diesel exhaust fluid into the flowing exhaust gas upstream of the close-coupled SCR unit;

reloading the close-coupled SCR unit with ammonia;

determining the close-coupled SCR unit has reached a threshold ammonia loading; and upon determining the close-coupled SCR unit has reached the threshold ammonia loading, determine (1) an amount of ammonia loaded in the close-coupled SCR unit after restarting dosing of diesel exhaust fluid into the flowing exhaust gas upstream of the close-coupled SCR unit, (2) an amount of ammonia used for NOx conversion in the close-coupled SCR unit after restarting dosing of diesel exhaust fluid into the flowing exhaust gas upstream of the close-coupled SCR unit and (3) an amount of ammonia oxidized in the SCR unit after restarting dosing of diesel exhaust fluid into the flowing exhaust gas upstream of the close-coupled SCR unit; and evaluating an amount of ammonia stored in the close-coupled SCR unit by subtracting (2) and (3) from (1); and during the evaluating ammonia storage capacity of the close-coupled SCR unit, controlling NOx emissions from the EAS using a downstream SCR unit; and adjusting one or more operation parameters of the EAS based on the result of the evaluating ammonia storage capacity of the close-coupled SCR unit.

11. The method of claim 10, wherein the one or more operation parameters of the EAS is selected from dosing rate of diesel exhaust fluid to the close-coupled SCR unit, dosing rate of diesel exhaust fluid to the downstream SCR unit, temperature of the close-coupled SCR unit and temperature of the downstream SCR unit.

12. The method of claim 10, further comprising adjusting one or more operation parameters of the internal combustion engine connected to the EAS based on the result of the evaluating ammonia storage capacity of the close-coupled SCR unit.

13. The method of claim 12, wherein the one or more operation parameters of the internal combustion engine connected to the EAS is selected from load on the internal combustion engine, temperature of exhaust gas from the internal combustion engine, volumetric flow of exhaust gas, volumetric flow of air through the internal combustion engine, temperature of air flow to the internal combustion engine and fuel to air mixture for the internal combustion engine.

14. The method of claim 13, wherein the load on the internal combustion engine is adjusted by driving an electric generator with the internal combustion engine and/or deactivating a cylinder of the internal combustion engine.

15. The method of claim 13, wherein the temperature of the exhaust gas is adjusted by exhaust gas recirculation or adding thermal energy to the exhaust gas.

16. The method of claim 13, wherein the volumetric flow of air is adjusted by deactivating one or more cylinders of the internal combustion engine and/or reducing idling speed of the internal combustion engine.

17. An emission management system for a vehicle including an internal combustion engine and an emission aftertreatment system (EAS) that includes a close-coupled SCR unit and a downstream SCR unit, the emission management system comprising:

at least one nontransitory processor-readable storage medium that stores one of processor-executable instructions or data;

at least one processor communicatively coupled to the at least one nontransitory processor-readable storage medium, in operation, the at least one processor:

receives an indication of an ammonia storage capacity of a close-coupled SCR unit determined while operating the EAS at steady state conditions, the indication of the ammonia storage capacity of the close-coupled SCR unit determined by:
operating the EAS at steady state conditions;
dosing diesel exhaust fluid, into exhaust gas from the internal combustion engine, upstream of the close-coupled SCR unit;
flowing the exhaust gas, into which the diesel exhaust fluid has been dosed, through the close-coupled SCR unit;
flowing the exhaust gas from the close-coupled SCR unit through the downstream SCR unit;
terminating the dosing of diesel exhaust fluid into the flowing exhaust gas upstream of the close-coupled SCR unit;
depleting ammonia stored in the close-coupled SCR unit;
restarting the dosing of diesel exhaust fluid into the flowing exhaust gas upstream of the close-coupled SCR unit;
reloading the close-coupled SCR unit with ammonia;
determining the close-coupled SCR unit has reached a threshold ammonia loading;
upon determining the close-coupled SCR unit has reached the threshold ammonia loading, determine (1) an amount of ammonia loaded in the close-coupled SCR unit after restarting dosing of diesel exhaust fluid into the flowing exhaust gas upstream of the close-coupled SCR unit, (2) an amount of ammonia used for NOx conversion in the close-coupled SCR unit after restarting dosing of diesel exhaust fluid into the flowing exhaust gas upstream of the close-coupled SCR unit and (3) an amount of ammonia oxidized in the SCR unit after restarting dosing of diesel exhaust fluid into the flowing exhaust gas upstream of the close-coupled SCR unit; and
generating an indication of the amount of ammonia stored in the close-coupled SCR unit by subtracting (2) and (3) from (1);
stores the received indication of an ammonia storage capacity of a close-coupled SCR unit determined while the EAS operates at steady state conditions in the nontransitory processor-readable storage medium; and
controls the operation of the internal combustion engine and/or the EAS, using the received indication of ammonia storage capacity, to control emissions from the EAS to within prescribed limits.

18. The emission management system of claim 17, wherein the at least one processor initiates an adjustment of one or more of dosing rate of diesel exhaust fluid to the close-coupled SCR unit, dosing rate of diesel exhaust fluid to the downstream SCR unit, temperature of the close-coupled SCR unit and temperature of the downstream SCR unit.

19. The emission management system of claim 17, wherein the at least one processor initiates an adjustment of load on the internal combustion engine, temperature of exhaust gas from the internal combustion engine, volumetric flow of exhaust gas, volumetric flow of air through the internal combustion engine, temperature of air flow to the engine and fuel to air mixture for the internal combustion engine.

* * * * *